US007768912B2

(12) United States Patent
Akinaga et al.

(10) Patent No.: US 7,768,912 B2
(45) Date of Patent: Aug. 3, 2010

(54) REGULATION CONTROL SYSTEM, RADIO COMMUNICATION TERMINAL UNIT, REGULATION CONTROL METHOD, AND RADIO COMMUNICATION TERMINAL CONTROL METHOD

(75) Inventors: Yoshikazu Akinaga, Chiyoda-ku (JP); Shigeru Kaneda, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 351 days.

(21) Appl. No.: 11/544,662

(22) Filed: Oct. 10, 2006

(65) Prior Publication Data

US 2007/0081487 A1 Apr. 12, 2007

(30) Foreign Application Priority Data

Oct. 7, 2005 (JP) .............................. 2005-295407

(51) Int. Cl.
*H04B 7/005* (2006.01)
(52) U.S. Cl. ........................ 370/230; 370/229; 370/310
(58) Field of Classification Search .................. 370/445
See application file for complete search history.

(56) References Cited

U.S. PATENT DOCUMENTS

| 6,078,568 | A * | 6/2000 | Wright et al. ................ 370/312 |
| 6,370,111 | B1 * | 4/2002 | Takeda et al. ................ 370/216 |
| 6,411,814 | B1 * | 6/2002 | Hirade ........................ 455/510 |
| 6,434,191 | B1 * | 8/2002 | Agrawal et al. .............. 375/227 |
| 2001/0012270 | A1 * | 8/2001 | Godoroja .................... 370/230 |
| 2001/0034790 | A1 * | 10/2001 | Sato et al. .................... 709/235 |
| 2005/0037770 | A1 * | 2/2005 | Takeda et al. ................ 455/453 |
| 2005/0153747 | A1 | 7/2005 | Egami et al. |

FOREIGN PATENT DOCUMENTS

| EP | 1 496 715 A1 | 1/2005 |
| JP | 04-351023 A | 12/1992 |
| JP | 04-373328 A | 12/1992 |
| JP | 05-336038 A | 12/1993 |
| JP | 09-064877 A | 3/1997 |
| JP | 09-139975 A | 5/1997 |
| JP | 2000-165519 A | 6/2000 |
| JP | 2002-281152 A | 9/2002 |
| JP | 2003-70059 A | 3/2003 |

OTHER PUBLICATIONS

Extended European Search Report dated Jan. 19, 2007 (Seven (7) pages).
European Patent Office Examination Report.

* cited by examiner

*Primary Examiner*—Huy D Vu
*Assistant Examiner*—James P Duffy
(74) *Attorney, Agent, or Firm*—Crowell & Moring LLP

(57) ABSTRACT

To abolish grouping and realize a regulation of the whole terminal at a high accuracy in accordance with an optional regulation rate. A communication regulation state change instruction is output from the timer generator means 23 at a cycle corresponding to the regulation unit time communicated from a radio base-station apparatus 1 to a radio communication terminal unit 2. When the communication regulation state change instruction is output, a communication regulation state is determined in accordance with a result of comparison of the random number generated by the random-number generating means 25 with a predetermined regulation rate. A communication of the radio communication terminal unit is regulated in accordance with the determination. Thus, it is possible to autonomously determine whether the present state is a regulation state in accordance with the clock value of a timer by the terminal unit and change operation states.

6 Claims, 6 Drawing Sheets

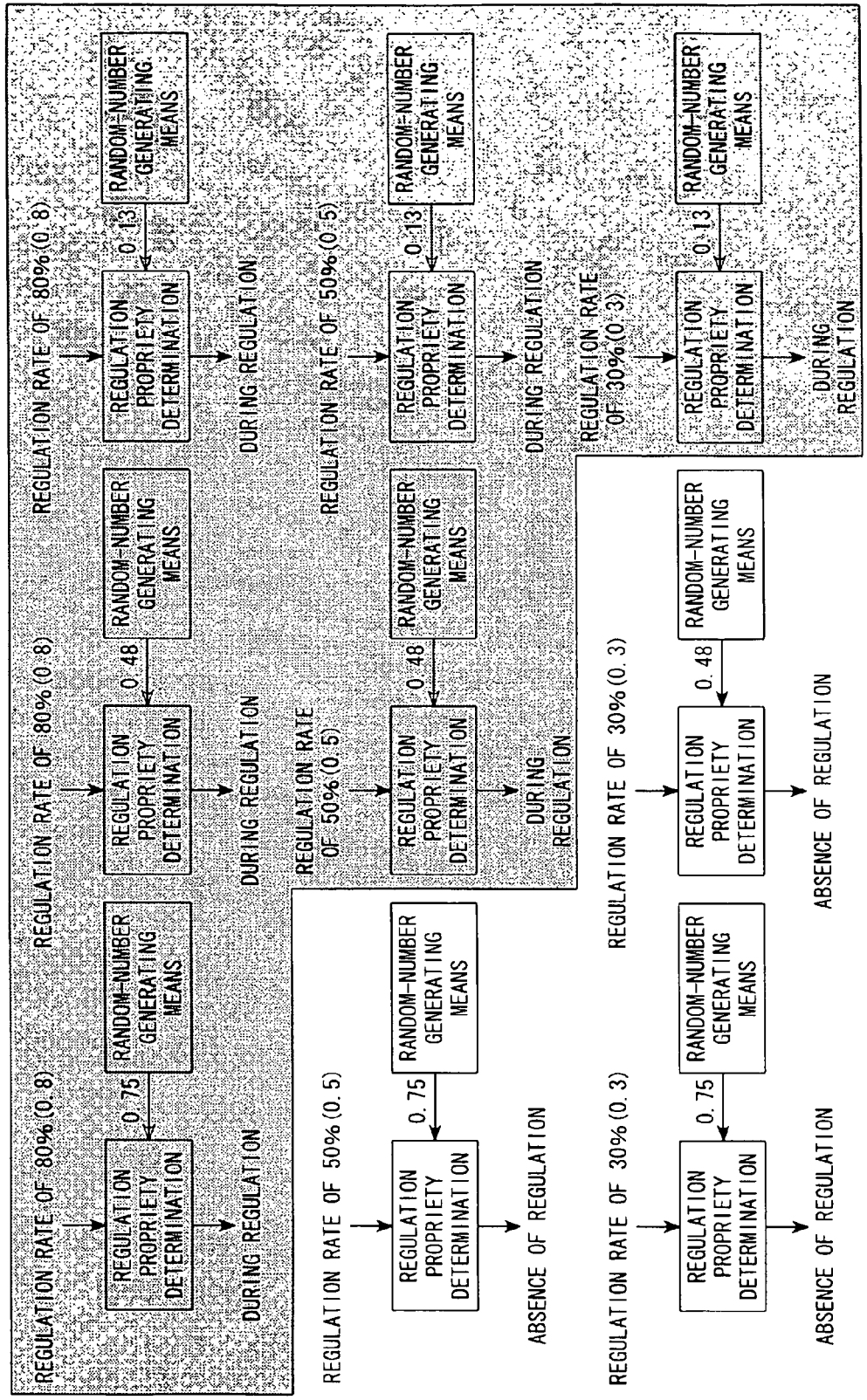

REGULATION CONTROL SYSTEM, RADIO COMMUNICATION TERMINAL UNIT, REGULATION CONTROL METHOD, AND RADIO COMMUNICATION TERMINAL CONTROL METHOD

BACKGROUND OF THE INVENTION

1. Field of the Invention

The present invention relates to a regulation control system, a radio communication terminal unit, a regulation control method, and a radio communication terminal control method and in particular to a regulation control system for regulating communication in radio communication, a radio communication terminal unit for use in the system, a regulation control method and a radio communication terminal control method.

2. Description of the Related Art

Conventionally, one method of regulation control in radio communication has been a grouping. In this grouping method, radio communication terminals are grouped in advance or by means of a unique identifier, and a base station or an access system provides the groups at a constant time interval with information indicating which group is currently regulated for each regulated group to accomplish the regulation. In the grouping method, the contents are determined in advance during system establishment and cannot be changed after commencement of the system operation.

This type of conventional transmission regulating mode includes, for example, "transmission regulating mode" disclosed in Patent Document 1 and "regulating mode for each radio base station" disclosed in Patent Document 2. Moreover, in the case of a digital cellular phone, there is the "transmission regulating mode" disclosed in Patent Document 3 as one technique for determining regulation by means of a random number without using the grouping.

Moreover, as a transmission regulation using a random number, there are techniques disclosed in Patent Documents 4 and 5. In the case of Patent Document 4, to stepwise change the level of transmission regulation depending on the level of a load, a random number is generated and the result of comparison of the obtained random number with a regulated number-of-call ratio is relied upon to accomplish the regulation. Moreover, the random number to be generated is limited between "0" and "100" to match a percentage number representing the regulated number-of-call ratio. In the case of Patent Document 5, increase of a load in a communication network is restrained by controlling the connection to a specified connection destination in accordance with the result of comparison of a generated random number with a threshold value.

[Patent Document 1] JP05-336038A
[Patent Document 2] JP04-351023A
[Patent Document 3] JP09-139975A
[Patent Document 4] JP09-064877A
[Patent Document 5] JP2002-281152A

SUMMARY OF THE INVENTION

However, in the techniques of grouping in regulation control as described above, a unit of group controlled to accomplish the regulation is determined depending on the number of terminal groups that have been divided, and it is necessary to determine the division when the specification of the system is determined. Moreover, it is impossible to regulate a terminal at an accuracy equal to or higher than the number of divided groups under high congestion. Furthermore, excessively small divided groups may extend the length of an instruction for communicating the regulation in a communication channel, and because the position of a terminal group to be regulated is uncertain, it is uncertain whether a terminal involved in the terminal group to be regulated is present in the range of a base station or an access system to be controlled, imposing difficulties on achieving a desired regulation rate.

Moreover, in the case of a regulation determining mode by means of random numbers for solving these problems, a probability in which one terminal is available for communication tends to be extremely deteriorated at the time of high congestion. And the time interval tends to vary until the terminal becomes ready for communication.

The present invention is made to solve the above-described conventional technical problem and its object is to provide a regulation control system, radio communication terminal unit, regulation control method, and radio communication terminal control method capable of disusing group division and realizing the regulation of the whole terminal at a high accuracy in accordance with an optional regulation rate.

The regulation control system of claim 1 of the present invention is provided with a radio base-station apparatus for communicating the regulation unit time associated with communication regulation and a radio communication terminal unit including a timer generator means for outputting a communication regulation state change instruction at a cycle corresponding to the regulation unit time communicated from the radio base-station apparatus, a random-number generating means for generating a random number and a regulation propriety determining means for determining a communication regulation state in accordance with a result of comparison of a random number generated by the random-number generating means with a predetermined regulation rate when a communication regulation state change instruction is output from the timer generator means, wherein the communication of the apparatus of its own is regulated in accordance with the determination of the regulation propriety determining means. By setting a timer not at the base-station apparatus side but at the terminal unit side, it is possible to autonomously determine whether a regulation state is realized in accordance with a clock value of the timer by the terminal unit and change operation states.

The regulation control system of claim 2 of the present invention has in claim 1 a feature that the timer generator means stores the regulation unit time and outputs a communication regulation state change instruction at a cycle corresponding to the stored regulation unit time. By storing a regulation unit time which is a random-number generation cycle in the terminal unit side and controlling a timer set to the terminal unit, it is possible to autonomously perform regulation control by leaving the terminal unit as it is when the regulation unit time is supplied.

The radio communication terminal unit of claim 3 of the present invention is provided with a timer generator means for outputting a communication regulation state change instruction at a cycle corresponding to a regulation unit time on the communication regulation communicated from the outside, a random-number generating means for generating a random number, and a regulation propriety determining means for determining a communication regulation state in accordance with a result of comparison of a random number generated by the random-number generating means with a predetermined regulation rate when a communication regulation state change instruction is output from the timer generator means, wherein communication of the apparatus of its own is regulated in accordance with the determination of the regulation propriety determining means. By setting a timer to the terminal unit side, it is possible to change operation states by autonomously determining whether a regulation state is realized in accordance with the clock value of the timer by the terminal unit.

The radio communication terminal unit of claim 4 of the present invention has in claim 3 a feature that the timer generator means stores the regulation unit time and outputs a communication regulation state change instruction at a cycle corresponding to the stored regulation unit time. By storing the regulation unit time which is a random-number generation cycle in the terminal unit side and controlling a timer set to the terminal unit, it is possible to autonomously perform regulation control by leaving the terminal unit as it is when the regulation unit time is supplied.

The regulation control method of claim 5 of the present invention is a regulation control method of a regulation control system including a radio base-station apparatus and a radio communication terminal unit and includes a step of communicating the regulation unit time associated with communication regulation from the radio base-station apparatus to the radio communication terminal unit, a step of outputting a communication regulation state change instruction at a cycle corresponding to the regulation unit time communicated from the radio base-station apparatus, a random-number generating step of generating a random number, and a regulation propriety determining step for determining a communication regulation state in accordance with a result of comparison of the random number generated in the random-number generating step with a predetermined regulation rate when the communication regulation state change instruction is output, wherein communication of the radio communication terminal unit is regulated in accordance with the determination in the regulation propriety determining step. By using this control method, it is possible to change operation states by autonomously determining whether a regulation state is realized in accordance with the clock value of a timer by the terminal unit.

The radio communication terminal control method of claim 6 of the present invention is a radio communication terminal control method for controlling a radio communication terminal unit in which a regulation unit time associated with a communication regulation is communicated from a radio base-station apparatus, which includes a step of outputting a communication regulation state change instruction at a cycle corresponding to the communicated regulation unit time, a random-number generating step of generating a random number and a regulation propriety determining step of determining a communication regulation state in accordance with a result of comparison of the random number generated in the random-number generating step with a predetermined regulation rate when the communication regulation state change instruction is output, wherein a communication of the radio communication terminal unit is regulated in accordance with the determination in the regulation propriety determining step. By using this control method, it is possible to change operation states by autonomously determining whether a regulation state is realized in accordance with the clock value of a timer by the terminal unit.

In short, the present invention makes it possible to realize a regulation control method in which a communication state is determined and fairness of a communication opportunity is not lost at an optional and high accuracy of communication regulation. Moreover, as long as a regulation rate is not changed, it is possible to continue regulation in accordance with the regulation rate even if there is not regulation information by communication information and at the same time, increase the number of communication opportunities for one terminal. Furthermore, by abolishing grouping and determining regulation propriety using a random number, it is unnecessary to consider a portion at which it is difficult to change the number of groupings for regulation at the time of design and it is possible to accurately execute regulation as a regulation rate is increased.

According to the present invention, by abolishing grouping and determining regulation propriety using a random number, it is unnecessary to consider a portion at which it is difficult to change the number of groupings for regulation at the time of design and accurately realize the regulation at the time of high regulation. Moreover, because the regulation information is communicated from a communication channel only when states are changed, a temporal accuracy are optionally realized and particularly it is possible to restrain the fluctuation of the number of communicable times for one terminal at the time of a high regulation rate. As a result, it is possible to perform the whole regulation at high accuracy in accordance with an optional regulation rate. Furthermore, because a regulation state change is exercised by a timer in a radio communication terminal unit, there are advantages that it is unnecessary to communicate the communication information on regulation control in accordance with a change of states and a radio communication band for communicating communication information is not oppressed even if a time interval is shortened.

BRIEF DESCRIPTION OF THE DRAWINGS

FIG. 6 is a drawing showing a communication propriety determining example of the regulation propriety determining means in FIG. 1.

DETAILED DESCRIPTION OF THE PREFERRED EMBODIMENTS

Figure 1:
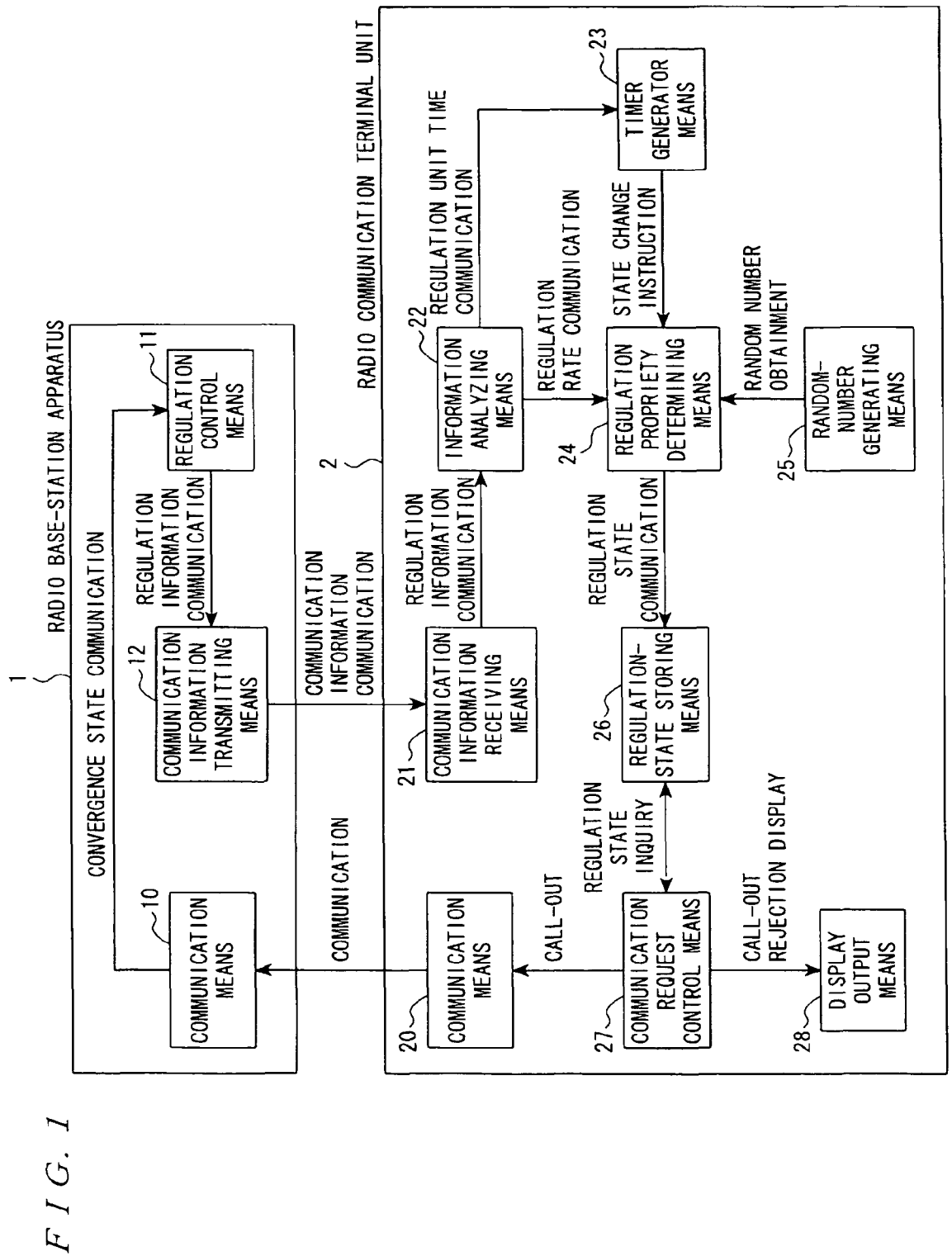
FIG. 1 is a block diagram showing a configuration of a regulation control system of an embodiment of the present invention.

Embodiments of the present invention are described below by referring to the accompanying drawings. In the drawings to be referred in the following description, a portion same as that in other drawing is shown by the same symbol.

(Regulation Control System)

First, a configuration of the regulation control system for radio communication of this embodiment is described below.

FIG. 1 is a block diagram of the regulation control system for radio communication of this embodiment. The regulation control system of this embodiment has a radio base-station apparatus 1 and a radio communication terminal unit 2. A plurality of radio base-station apparatuses 1 and a plurality of radio communication terminal units 2 are actually used. In this case, however, each of the apparatuses and each of the terminal units are described for simplicity of description.

The radio base-station apparatus 1 is constituted by including the communication means 10 for communicating with the radio communication terminal unit 2, the regulation control means 11 capable of determining a regulation rate and regulation change time in accordance with the information on a communication state obtained by the communication means 10, and the communication information transmitting means 12 capable of communicating the information. The radio base-station apparatus 1 can use, for example, the base-station apparatus of a cellular phone system and an access-point apparatus for radio LAN.

The radio communication terminal unit 2 is constituted by including the communication means 20 for communicating with the radio base-station apparatus 1, the communication information receiving means 21 capable of receiving the communication information, the information analyzing means 22 capable of analyzing the information and separating the regulation information, the timer generator means 23 capable of instructing a change of regulation states in accordance with regulation unit time, the regulation propriety determining means 24 capable of storing the regulation rate included in regulation information and determining the propriety of regulation in accordance with a change of regulation states, the random-number generating means 25 capable of generating a random number in accordance with a request from the regulation propriety determining means, the regulation-state storing means 26 capable of storing a regulation state determined by regulation propriety determining means, the communication request control means 27 for determining whether to abolish the communication request in accordance with a communication regulating state when a communication request or communication session start request occurs in a radio communication terminal unit, and the display output means 28 for displaying various pieces of information including call-out rejection display. The radio communication terminal unit 2 can use, for example, a communication terminal of a cellular phone system or a communication terminal having radio communication means such as radio LAN (Local Area Network).

The radio base-station apparatus 1 also assumes a purposed case such as ad hoc communication. In this case, it is possible to consider that a function corresponding to a radio base-station apparatus is included in each terminal of a radio communication terminal unit 2. However, it is necessary to include a function capable of communicating a communication information from a radio base-station apparatus to a radio communication terminal unit.

(Reception of Regulation Information)

Figure 2:
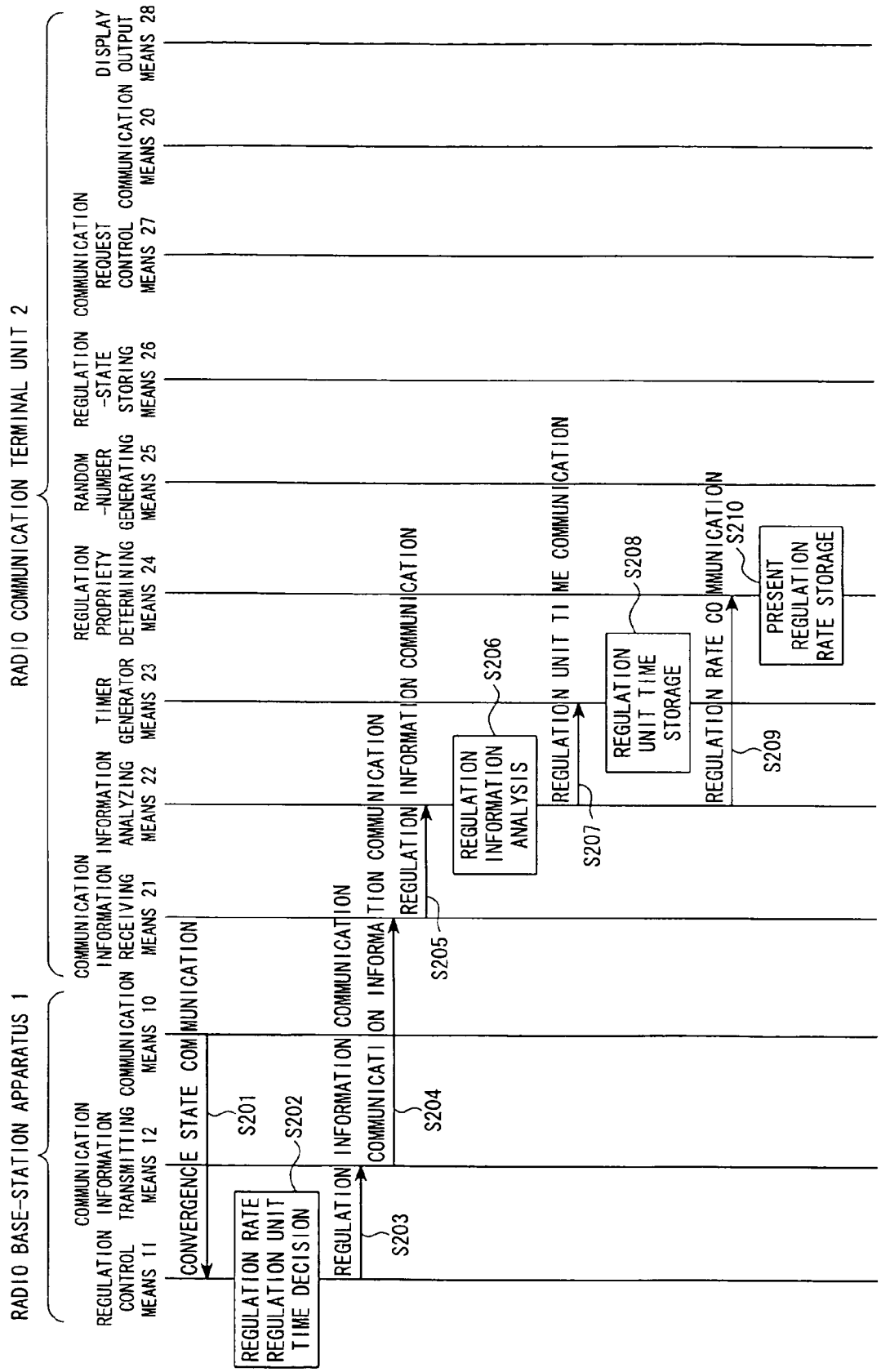
FIG. 2 is a sequence diagram showing regulation information reception of the regulation control system in FIG. 1.

FIG. 2 is a sequence diagram for receiving regulation information.

When a congestion state occurs in the communication means 10 in a radio base-station apparatus, the information on the congestion state is communicated to the regulation control means 11 (S201). Contents of the information include, for example, a CPU usage rate, a band usage rate, the number of packets for unit time, a bit error rate, and an interference rate. The regulation control means 11 determines a regulation rate and a regulation unit time by using those pieces of information (S202). The regulation rate and regulation unit time respectively use a predetermined numerical value or a value determined in accordance with the information finally returned from the communication means 10 according to the regulation rate. Similarly, the regulation unit time is determined in accordance with those pieces of information.

Determined regulation rate and regulation unit time are sent to the communication information transmitting means 12 as a regulation information (S203). A determined value is communicated only when it is changed or it is changed by exceeding a previously designated threshold value. The communication information transmitting means 12 transmits communication information to the radio communication terminal unit 2 (S204). The communication information transmitted from the radio base-station apparatus 1 is received by the communication information receiving means 21 in the radio communication terminal unit 2 and the communication information receiving means 21 sends the received communication information to the information analyzing means 22 (S205). The information analyzing means 22 analyzes the information in the communication information (S206).

The information analyzing means 22 extracts the regulation rate and regulation unit time from the communication information. The extracted regulation unit time is communicated from the information analyzing means 22 to the timer generator means 23 (S207). The timer generator means 23 stores the communicated regulation unit time (S208) and outputs a state change instruction to the regulation propriety determining means 24 every the stored unit time. Moreover, the regulation rate is communicated from the information analyzing means 22 to the regulation propriety determining means 24 (S209). The regulation propriety determining means 24 stores the communicated regulation rate and determines the regulation propriety conforming to the regulation rate in accordance with a state change instruction (S210).

(Exercise of Regulation Timer and Change of Regulation States)

Figure 3:
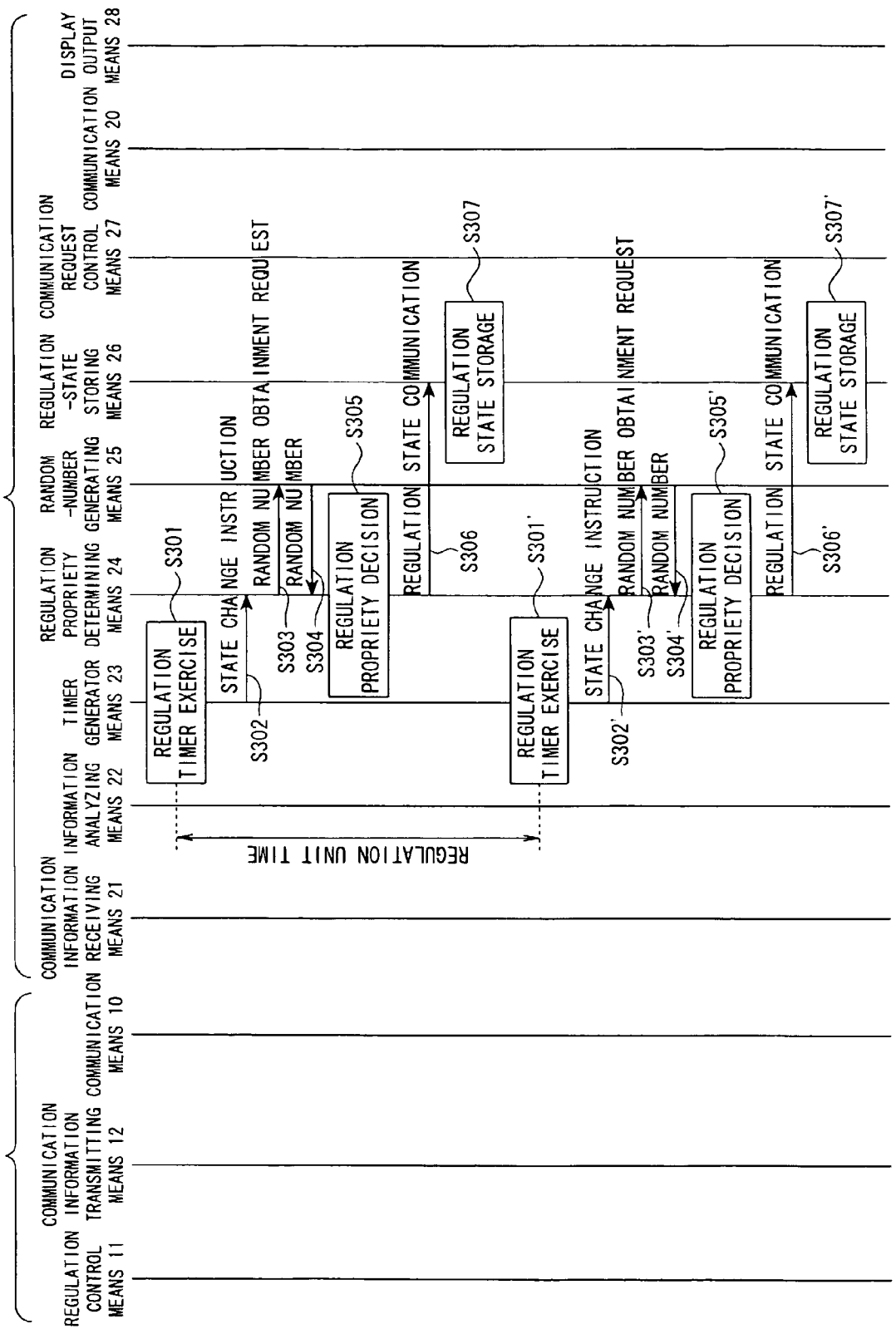
FIG. 3 is a sequence diagram showing an exercise of a regulation timer of the regulation control system and the change of the regulation states in FIG. 1.

FIG. 3 is a sequence diagram showing exercise of a regulation timer and change of the regulation states.

As described above, the timer generator means 23 periodically exercises a regulation timer in accordance with the regulation unit time (S301 and S301') and outputs a state change instruction to the regulation propriety determining means 24 (S302 and S302'). When the regulation propriety determining means 24 receives the state change instruction, it outputs a random-number obtaining request to the random-number generating means 25 (S303 and S303').

When the random-number generating means 25 receives the random-number obtaining request, it generates a random number value and returns it (S304 and S304'). In this case, to simplify description, it is assumed that the random-number generating means 25 returns random number values between "0" and "1" for example. The regulation propriety determining means 24 which receives the random number values compares the random number values with the regulation rate stored in the regulation propriety determining means 24 to determine regulation propriety (S305 and S305'). Specifically, a comparison method will be described later by referring to FIG. 5.

After the regulation propriety determining means 24 determines regulation propriety, it communicates the regulation state to the regulation-state storing means 26 (S306 and S306'). The regulation-state storing means 26 stores the state of regulation propriety as the present regulation state (S307 and S307').

A regulation timer is periodically exercised in accordance with the regulation unit time and the above operation is repeated.

(Communication Regulation)

Figure 4:
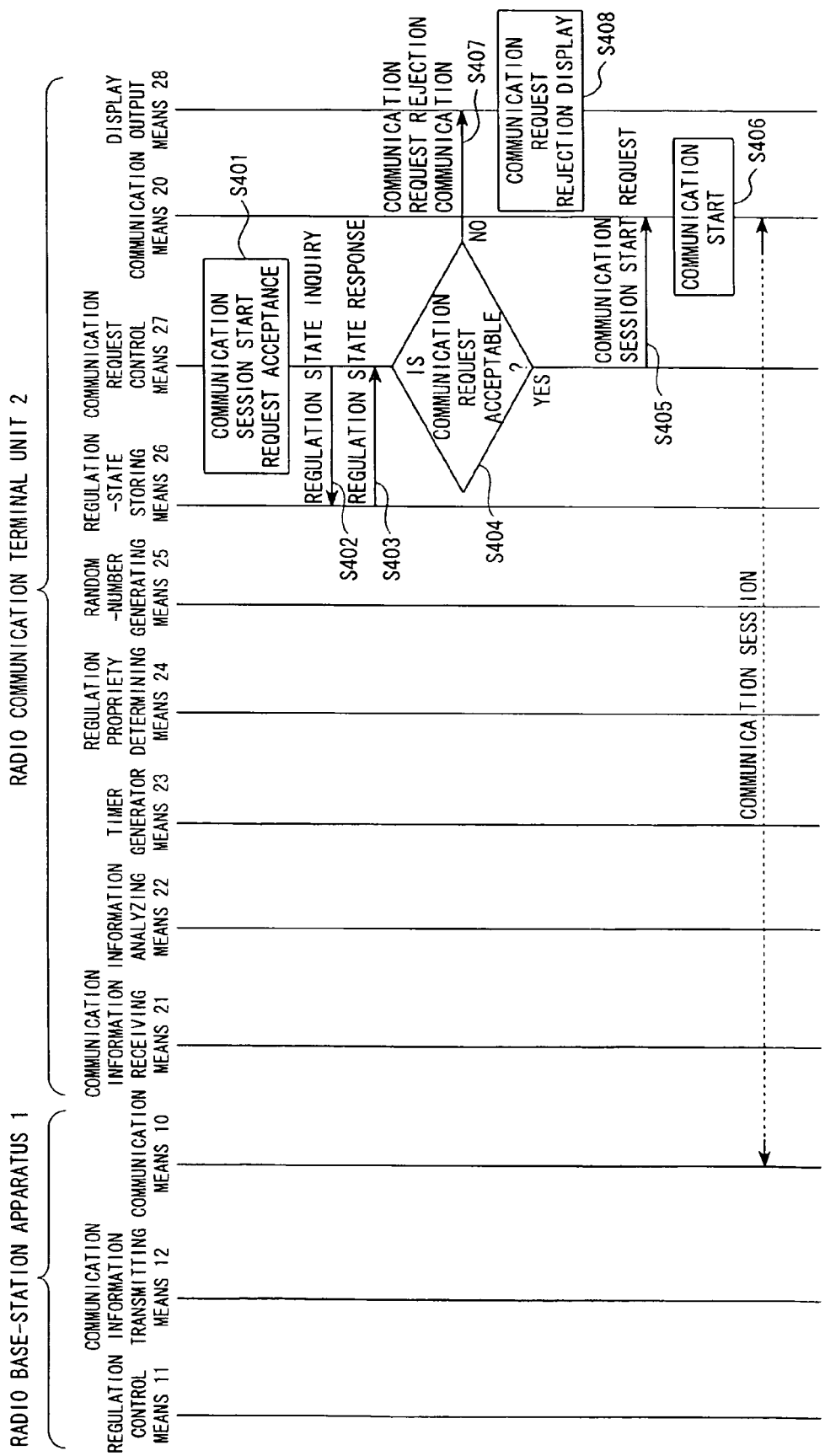
FIG. 4 is a sequence diagram showing communication regulation when actual communication occurs in the regulation control system in FIG. 1.

FIG. 4 is a sequence diagram of communication regulation when actual communication occurs.

When a communication request or a communication session start request occurs in a radio communication terminal unit, the communication request control means 27 determines whether to cancel the communication request in accordance with a communication regulation state. When the communication request control means 27 receives the communication request or the communication session start request (S401), it inquires to the regulation-state storing means 26 about a regulation state (S402). The regulation-state storing means 26 returns the stored regulation state as a regulation state response (S403). The regulation state response includes a state on whether presence is regulated. That is, the information showing the propriety on whether a communication request can be received.

When the present state is a communication request acceptable state, that is, an unregulated state, the communication session is directly started, the information including a communication session start request is sent to the communication means and the communication is started (S404→S405→S406).

However, when the present state is a communication request impossible state, that is, a regulated state, the communication session is cancelled, a communication request rejection display is sent to display output means 28, and it is communicated to a user or system that the communication request is canceled (S404→S407→S408).

(Regulation Propriety Decision)

Figure 5:
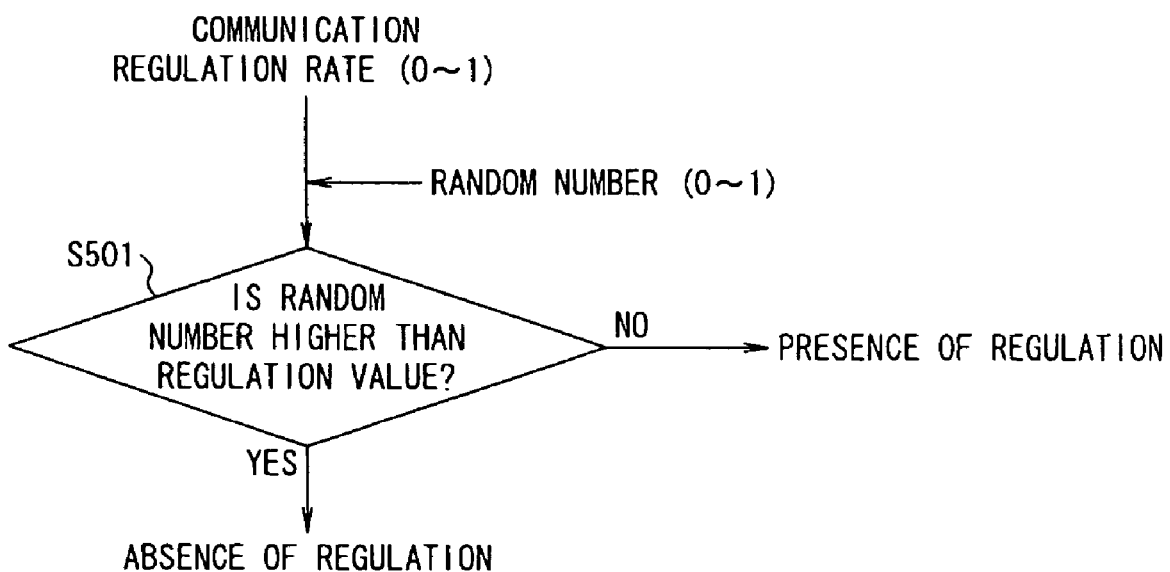
FIG. 5 is a sequence diagram showing a regulation propriety determining method of the regulation propriety determining means in FIG. 1.

FIG. 5 is a drawing showing a regulation propriety determining method in the regulation propriety determining means 24.

In FIG. 5, by comparing a communication regulation rate whose range is previously determined (for example, 0 to 100% or numerical values of "0" to "1") with a random-number value whose range of occurrence coincides with the above range, the regulation propriety (presence of regulation or absence of regulation) in the regulation propriety determining means 24 is determined (S501). Then, by assuming a case in which a communication regulation rate outruns a random number as "presence of regulation" and a case in which the communication regulation rate under runs the random number as "absence of regulation", the regulation propriety is determined.

For example, in the case of a communication regulation rate specified in a range of "0" to "1" and a random number output in a range of "0" to "1", when the communication regulation rate is "0.5" and the value of the random number is "0.3", "presence of regulation" is set, while when the communication regulation rate is "0.5" and the value of the random number is "0.7", "absence of regulation" is set. By performing this control, it is theoretically requested to keep a high regulation accuracy at the time of high regulation rate. Moreover, processings for these regulation propriety decisions are requested whenever they are exercised by the timer generator means 23. Therefore, a regulation state is determined whenever a regulation timer is exercised by the timer generator means 23.

FIG. 6 is a drawing showing an example of a communication propriety decision in the regulation propriety determining means 24.

FIG. 6 shows communication propriety decision when random numbers "0.75", "0.48", and "0.13" are input from the random-number generating means at regulation rates of 80%, 50%, and 30%. Hatched portions in FIG. 6 correspond to a case to be communication-regulated. In the case of this example, a regulation state is determined as presence of communication regulation when a random-number value is smaller than a communicated regulation rate and as absence of communication regulation when a random-number value is larger than the communicated regulation rate.

In FIG. 6, even when any one of random numbers "0.75", "0.48", and "0.13" is input at a regulation rate of 80%, communication regulation is performed. Moreover, in the case of a regulation rate of 50%, when the random number "0.75" is input, communication regulation is not performed. However, when the random number "0.48" or "0.13" is input, communication regulation is performed. Furthermore, when a random number "0.75" or "0.48" is input at a regulation rate of 30%, communication regulation is not performed. However, when the random number "0.13" is input, communication regulation is performed.

(Application Example)

The configuration of each apparatus in the above-described regulation control system is not restricted to the above-described content but it is enough that an equivalent function is included.

Moreover, the communication request and communication session request described in this specification can be handled not only for a session request in voice communication such as call-out in call-out control of a cellular phone or SIP (Session Initiation Protocol) control of an IP phone but also for a session request of i-mode®, TCP session request in TCP/IP (Transmission Control Protocol/Internet Protocol), and a session request in data communication represented by the session request in various applications.

(Regulation Control Method)

In the case of the above-described regulation control system, the following regulation control method is realized. That is, the method is a regulation control method for a regulation control system including a radio base-station apparatus and a radio communication terminal unit, which includes a step of communicating the regulation unit time associated with the communication regulation from the radio base-station apparatus to the radio communication terminal unit, a step of outputting a communication regulation state change instruction at a cycle corresponding to the regulation unit time communicated from the radio base-station apparatus, a random-number generating step of generating a random number, and a regulation propriety determining step of determining a communication regulation state in accordance with a result of comparison of the random number generated in the above random-number generating step with a predetermined regulation rate when the communication regulation state change instruction is output, in which communication of the radio communication terminal unit is regulated in accordance with the determination in the regulation propriety determining step. By using this control method, it is possible to autonomously determine whether the present state is a regulation state in accordance with the clock value of a timer by the terminal unit and change operation states.

(Radio Communication Terminal Control Method)

In the case of the above-described regulation control system, the following radio communication terminal control method is realized. That is, the method is a radio communication terminal control method for controlling a radio communication terminal unit to which a regulation unit time associated with a communication regulation is communicated from a radio base-station apparatus, which includes a step of outputting a communication control state change instruction at a cycle corresponding the above communicated regulation unit time, a step of generating a random number, and a regulation propriety determining step of determining a communication regulation state in accordance with a result of comparison of the random number generated in the random-number generating step with a predetermined regulation rate when the communication regulation state change instruction is output, in which the communication of the radio communication terminal unit is regulated in accordance with the determination in the regulation propriety determining step. By using this control method, it is possible to autonomously determine whether a regulation state is realized in accordance with a clock value of a timer by the terminal unit and change operation states.

(Summary)

The present invention has a feature that a random number is issued every certain period to determine whether to regulate the random number whenever the random number is issued. That is, each terminal has a timer to autonomously change whether the terminal is kept in a regulation state in accordance with a timer. By performing the above operation, the following advantages can be obtained: it is possible to equally perform a regulation between terminals and a load applied to the regulation control does not influence a radio base-station apparatus and the like because a signal for acceptance is restrained.

Moreover, it is possible to freely change random numbers while they are generated and there is a feature in that the change period can be held at the terminal side. That is, by setting a timer to the terminal side instead of setting it to the radio base-station apparatus side, it is possible to directly autonomously perform regulation control when the unit time of the timer is supplied. Thereby, by once supplying a control signal (regulation time unit and regulation rate) in order to perform a regulation control, it is possible to autonomously perform a regulation control even if information is not subsequently supplied from the radio base-station apparatus side.

However, when both the regulation unit time and regulation rate are not supplied, the accuracy for executing a regulation rate differs compared to the case in which the regulation unit time and regulation rate are supplied. Specifically, when the regulation unit time can be controlled like the case of the above-described system, it is possible to eliminate the feeling of inequality between the terminals by shorting the regulation unit time. However, the regulation rate is still kept. Moreover, by adjusting the regulation unit time, it is also possible to improve the instability of regulation which occurs between call holding time and regulation rate.

The present invention can be used when regulating the communication in the radio communication.

What is claimed is:

1. A regulation control system comprising:
a radio base-station apparatus; and
a radio communication terminal unit,
the radio base-station apparatus including:
communication means for communicating with the radio communication terminal unit to communicate information on a congestion state when congestion occurs at the communication means;
regulation control means for determining regulation information including a regulation rate and a regulation unit time relating to communication regulation by use of the information on the congestion state communicated from the communication means; and
communication information transmitting means for transmitting the regulation information including the regulation rate and the regulation unit time,
the radio communication terminal unit including:
timer generator means for storing the regulation unit time included in the regulation information transmitted from the communication information transmitting means of the radio base-station apparatus, and outputting a communication regulation state change instruction at a cycle corresponding to the regulation unit time,
random-number generating means for generating a random number; and
regulation propriety determining means for outputting to the random-number generating means a random-number obtaining request to obtain a random number upon receipt of the communication regulation state change instruction output from the timer generator means, and comparing the random number generated by the random-number generating means and the regulation rate included in the regulation information transmitted from the communication information transmitting means of the radio base-station apparatus so as to determine, without regard to whether a communication request is currently pending, whether communication of the radio communication terminal unit should be regulated,
wherein, in the event of a subsequent communication request the communication of the radio communication terminal unit is regulated in accordance with the communication regulation state determination of the regulation propriety determining means.

2. The regulation control system according to claim 1, wherein the information on the congestion state includes at least one of a CPU usage rate, a band usage rate, the number of packets for unit time, a bit error rate, and an interference rate.

3. The regulation control system according to claim 1, wherein the regulation information including the regulation rate and the regulation unit time that have been determined by the regulation control means is communicated with the communication information transmitting means, when any one of the regulation rate and the regulation unit time is changed.

4. A radio communication terminal unit comprising:
timer generator means for storing a regulation unit time and outputting a communication regulation state change instruction at a cycle corresponding to the regulation unit time transmitted from a radio base-station apparatus, the regulation unit time and a regulation rate being included in regulation information;
random-number generating means for generating a random number; and
regulation propriety determining means for outputting to the random-number generating means a random-number obtaining request to obtain a random number upon receipt of the communication regulation state change instruction output from the timer generator means, and comparing the random number generated by the random-number generating means and the regulation rate included in the regulation information transmitted from the radio base-station apparatus so as to determine, without regard to whether a communication request is currently pending, whether or not communication of the radio communication terminal unit should be regulated,
wherein, in the event of a subsequent communication request, the communication of the radio communication terminal unit is regulated in accordance with the communication regulation state determination of the regulation propriety determining means.

5. A regulation control method of a regulation control system including a radio base-station apparatus and a radio communication terminal unit, the method comprising:
communicating between the radio base-station apparatus and the radio communication terminal unit to communicate information on a congestion state when congestion occurs;

determining regulation information including a regulation rate and a regulation unit time relating to communication regulation by use of the information on the congestion state communicated from the communicating;

transmitting the regulation information including the regulation rate and the regulation unit time;

storing the regulation unit time included in the regulation information transmitted;

outputting a communication regulation state change instruction at a cycle corresponding to the regulation unit time;

outputting a random-number obtaining request to obtain a random number upon receipt of the communication regulation state change instruction;

generating a random number;

comparing the random number generated and the regulation rate included in the regulation information transmitted;

determining, without regard to whether a communication request is currently pending, whether or not communication of the radio communication terminal unit should be regulated; and regulating, in the event of a subsequent communication request, the communication of the radio communication terminal unit in accordance with the determining of the communication regulation state.

6. A radio communication terminal control method for controlling a radio communication terminal unit, the method comprising:

communicating between the radio base-station apparatus and the radio communication terminal unit to communicate information on a congestion state when congestion occurs;

determining regulation information including a regulation rate and a regulation unit time relating to communication regulation by use of the information on the congestion state during the communicating;

transmitting the regulation information including the regulation rate and the regulation unit time;

outputting a communication regulation state change instruction at a cycle corresponding to the regulation unit time, transmitted;

outputting a random-number obtaining request to obtain a random number upon receipt of the communication regulation state change instruction;

generating a random number;

comparing the random number generated and the regulation rate included in the regulation information transmitted;

determining, without regard to whether a communication request is currently pending, whether or not communication of the radio communication terminal unit should be regulated; and regulating, in the event of a subsequent communication request, the communication of the radio communication terminal unit in accordance with the determining of the communication regulation state.

* * * * *